Patented Jan. 11, 1938

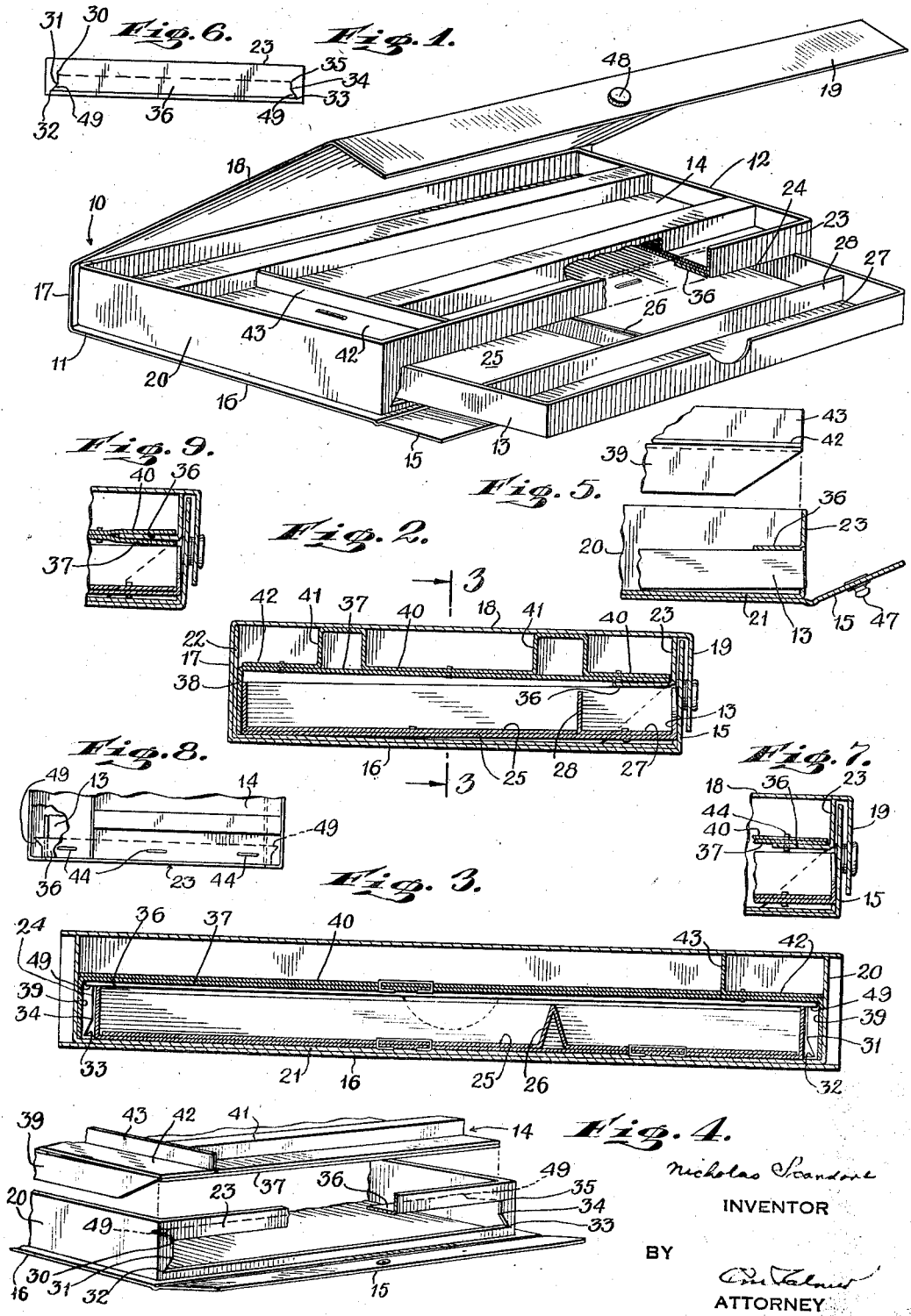
Jan. 11, 1938.    N. SCANDORE    2,105,163
SCHOLAR'S COMPANION
Filed July 1, 1936

2,105,163

UNITED STATES PATENT OFFICE 2,105,163

SCHOLAR'S COMPANION

Nicholas Scandore, Brooklyn, N. Y.

Application July 1, 1936, Serial No. 88,471

10 Claims. (Cl. 229—15)

The present invention relates to the art of making boxes and is especially concerned with a scholar's companion of the type having a slidable drawer and a superimposed tray each appropriately divided into compartments for storing pencil, erasers, pens, pen wipers, and other writing accessories. Hitherto in the art of making scholars' companions, an elongated opening was provided in the front wall of the receptacle for receiving the slidable drawer on which the superimposed tray is sustained. This method has several disadvantages. First the tray is left disconnected from the front wall of the receptacle and during use, it has been discovered that the front wall of the receptacle above the elongated opening is flexed or bowed outwardly, thus forming an undesirable gap between the bottom of the tray and the front wall of the receptacle. Hence articles within the tray accidentally fall through the gap into the drawer or out of the receptacle. Another disadvantage as a result of such construction is brought about in that the part of the front wall of the receptacle which is cut out therefrom to form the elongated drawer-receiving opening is discarded and therefore put to no useful purpose.

Accordingly the object of the present invention is realized by providing a scholar's companion in which a part of the body of the receptacle hitherto cut out to form the drawer-receiving opening is utilized to define an effective closure for the gap forming during use between the front wall of the receptacle and the bottom part of the superimposed tray. As a further object the invention contemplates the provision of a scholar's companion whereby a part of the front wall of the receptacle is appropriately scored and cut to provide a flap which if swung rearwardly towards the interior of the receptacle defines a transversely disposed flange which is free of the front wall of the receptacle along its side and bottom edges and provides along its upper scored portion a hinged connection. The invention further contemplates as an object the provision of an improved scholar's companion wherein a part of the front wall of the receptacle is employed to form intervening means interposed between the slidable drawer and superimposed tray, the intervening means having a configuration complemental to the elongated opening of the front wall of the receptacle and defining therewith an integral hinged connection.

The invention also consists in certain new and original features of construction and combination of parts hereinafter set forth and as to other objects, features, advantages, the mode of operation, and manner of its organization, these, inter alia may be better understood by referring to the following description considered in connection with the accompanying drawing forming a part thereof in which:

Fig. 1 is a view in perspective of one form of scholar's companion according to my invention, showing the cover unlocked and certain parts of the receptacle and superimposed tray broken away.

Fig. 2 is a transverse sectional view of Fig. 1, however with the cover of the latter in a locked relation.

Fig. 3 is a longitudinal sectional view taken along the line 3—3 of Fig. 2.

Fig. 4 is a fragmentary perspective view of Fig. 1 illustrating the tray removed from the receptacle and certain parts of the latter broken away.

Fig. 5 is a fragmentary and transverse view illustrating the rearwardly disposed hinged flange seated on the slidable drawer now disposed within the drawer-receiving opening of the receptacle.

Fig. 6 is a front view of the receptacle.

Fig. 7 is a fragmentary and transverse sectional view of a slightly modified form of scholar's companion.

Fig. 8 is a fragmenary plan view of Fig. 7 when the cover thereof is disconnected and raised to show the superimposed tray which is partly broken away to indicate the relation of the hinged flange in respect to the sides of the slidable drawer, and Fig. 9 is a fragmentary and transverse sectional view illustrating another slightly modified form of the invention.

Referring more particularly to the drawing, the scholar's companion generally denoted 10 comprises, a casing 11, a receptacle 12, a slidable drawer 13, and a superimposed tray 14. The casing includes a swingable front wall 15, a bottom wall 16, a rear wall 17, a cover 18, and a depending swingable flange 19, while receptacle 12 includes the upstanding rectangularly shaped rim 20.

Adhesively secured to the bottom wall 16 of the casing is the bottom wall 21 of the receptacle 12 and the rear wall 22 of the latter is adhesively secured to the rear wall 17 of the casing.

As shown, the front wall 23 of rim 20 is provided with an elongated opening 24 adapted to slidably receive drawer 13 permitting the latter to be displaced transversely of the casing.

Stapled or otherwise secured to the bottom wall of the drawer is an insert 25 having upstanding rib 26 dividing the rear portion of the drawer into several article-holding compartments. Also secured or stapled to the bottom wall of the drawer is an insert 27, which includes the upstanding brace 28 coextensive with the length of the drawer and frictionally cooperates with the sides thereof to hold the latter a predetermined distance apart. Brace 28 also frictionally abuts insert 25. The compartment formed between brace 28 and the forward wall of the drawer is adapted to receive pencils, pens, and other writing accessories.

According to the invention opening 24 in the front wall 23 of the upstanding rim of the receptacle is formed (see Fig. 6) by first cutting along the lines 30—31, 31—32, 32—33, 33—34, and 34 and 35, and scoring along the horizontal line 30—35. For purposes of specification that part of the front wall 23 bounded by the cut and scored lines may be said to be complementary to the remaining part of the front wall 23. As shown in the drawing this complementary portion is designated 36 and constitutes a flange integrally and hingedly associated with the front wall 23 of rim 20. Therefore this flange 36 may be swung rearwardly and upwardly, to assume a horizontal position as indicated in Fig. 5. If therefore, flange 36 is swung along the scored fulcrum line and out of the plane of the front wall of the receptacle, the drawer receiving opening 24 is formed.

As shown in Figs. 2 and 5, drawer 13 is within rim 20 and hinged flange 36 struck out from the front wall 23 bears against the sides of the drawer, thus tending to prevent transverse displacement of the latter.

With the drawer inserted in the receptacle and the hinged flange abutting the sides of the latter, tray 14 is inserted within the rim of the receptacle. This tray consists of a bottom wall 37 having a rear depending wing 38 and side depending wings 39. The tray is inserted within the rim of the receptacle in such fashion that rear wing 38 is interposed between the rear wall 22 of the receptacle and the rear wall of the slidable drawer (see Fig. 2) while the side wings 39 are interposed between the sides of the receptacle and the sides of the drawer (see Fig. 3).

Appropriately fastened or stapled to rectangular bottom wall 37 of tray 14 is an upper wall 40 which has been suitably formed to define the spaced longitudinal hollow ribs 41 to constitute with the walls of the rim of the receptacle a plurality of article-receiving compartments. Also appropriately attached to bottom wall 37 of tray 14 is an insert 42 having transversely disposed flange 43 forming with the receptacle another article-holding compartment.

Having inserted the tray within the rim of the receptacle, the bottom wall 37 of the tray (see Figs. 2 and 3) is seated on the struck-out hinged flange 36, that is to say, the forward part of the tray and the hinged flange 36 are in overlapped relation and hence flange 36 serves as a closure for the forward compartment formed between the front wall of the receptacle and the tray in the event that the upper part of the wall 23 above opening 24 has been accidentally bowed or flexed outwardly. In scholars' companions of the type well known in the art, involuntary and outwardly flexing of the upper part of wall 23 caused an undesirable gap with the superimposed tray and therefore when cover 18 of the casing was opened, articles within the forward compartment would accidentally fall through this undesirable gap formed between the tray and the receptacle. The present invention overcomes this disadvantage in that the hinged flange 36 serves as an intervenor between the drawer and tray and also serves as a closure for the tray even though the front wall 23 has been flexed outwardly.

Heretofore complementary portion 36 of the front wall of the receptacle was fully cut out and discarded. By the present invention, this complementary portion is employed to provide a new function forming hinged intervenor and closure means as previously pointed out. If desired the bottom and upper walls 37 and 40 of tray 14 may be fixedly fastened to hinged flange 36. In this connection attention is directed to Figs. 7 and 8 wherein all these members are fastened by a plurality of staples 44.

Further in accordance with the present invention, hinged flange 36 of the front wall of the receptacle may be interposed between and frictionally sustained by bottom and upper walls 37 and 40 of the tray as indicated in Fig. 9. In either of the forms shown, however, hinged flange 36 serves as a closure for the gap between the tray and the receptacle and therefore prevents accidental dispensing of the articles from the upper compartment formed by the tray and receptacle. In all the forms disclosed, the casing, receptacle, drawer, and tray are made of suitable ply cardboard, although the invention is not limited to such material.

With the drawer and tray in an assembled relation with the receptacle, articles in the latter are prevented from falling out. For this purpose, flap 15 is swung upwardly against front wall 23 of the rim of the receptacle, cover 18 is moved downwardly to close the top of the receptacle and flap 19 is moved to overhang flap 15. Flaps 15 and 19 are provided with complementary snap fasteners 47 and 48 for disconnectably locking these flaps together.

It will be noted that the complementary portion or hinged flange 36 is irregularly formed in that the lower part thereof (see Figs. 4, 6, and 8) is provided with flared and laterally extending wings 49. In all of the forms disclosed, these wings 49 overhang the sides of the slidable drawer 13 (see Fig. 8) and are free of the rear corners of the latter to facilitate removal of the drawer from the receptacle. It has been discovered that if the free corners of the hinged flange were made in the form of a right-angle and were disposed within the limits of the sides of the drawer, the corners of the hinged flange would abut the rear wall of the drawer during transverse displacement of the latter and thus prevent easy removal thereof from the receptacle. With the wings 49 overhanging the sides of the drawer and free of the rear corners thereof "sticking" of the drawer is prevented.

Without further analysis, the foregoing will so fully reveal the gist of the present invention that others can by applying current knowledge readily adapt it for various applications without omitting certain features that from the standpoint of the prior art, fairly constitute essential characteristics of the generic or specific aspect of this invention, and therefore, such adaptations should and are intended to be comprehended within the meaning of the following claims:—

I claim:—

1. In a box, the combination of, a casing, a receptacle secured to said casing and including a front wall having an opening, a flange extending into said receptacle from an upper edge of said opening, a drawer slidably guided in said opening, and a tray mounted within said receptacle and having a forward portion thereof overlapping said flange for holding the latter against said drawer.

2. In a box, the combination of, a casing, a receptacle secured to said casing, a member movably secured to the front wall of said receptacle and initially in the plane of said wall and subsequently swung rearwardly and upwardly relative to said wall to constitute a flange and define an opening in said wall, a drawer slidably guided in said opening, and a tray above said drawer and having a forward portion seated on and overlapping said flange to hold the latter yieldingly against said drawer.

3. In a box, the combination of, a casing, a receptacle secured to said casing and having a front wall, a member integral with and movably secured to said wall and initially in the plane of the latter and subsequently swung out of said plane to constitute a flange and to define an opening in said wall, a drawer slidably guided by the walls of said opening, and a tray inserted in said receptacle and having a forward portion seated on said flange, said flange constituting closure means between said front wall of the receptacle and said forward portion of the tray.

4. In a box, the combination of, a casing, a receptacle secured to said casing and having a front wall, a member integral with said wall and having an upper portion movably secured thereto and swung rearwardly of said wall to define an opening in the latter, said member when disposed rearwardly of said wall constituting a flange, a drawer slidably guided in said opening, a tray mounted within said receptacle and having a forward part seated on and overlapping said flange, said forward part cooperating to hold said flange against the sides of said drawer, said flange constituting closure means between said front wall of the receptacle and said forward part of the tray.

5. In a box, the combination of, a casing, a receptacle secured to said casing, a member movably secured to the front wall of said receptacle and swung out of said wall to constitute an opening in the latter and to provide a flange disposed within said receptacle, a drawer slidably guided in said opening, a tray mounted within said receptacle and in part seated on said flange, said flange constituting closure means between the forward part of said tray and said front wall, said tray cooperating to yieldingly hold said flange against the sides of said drawer, said flange having means overhanging said sides to facilitate removal of said drawer from said receptacle.

6. In a box, the combination of, a casing, a receptacle secured to said casing, and comprising a front wall having an opening, a flange extending rearwardly of said wall and secured to the latter above said opening, a drawer slidably guided in said opening, and a tray mounted within said receptacle and seated on said flange, said flange constituting closure means between the forward part of said tray and said wall and said tray cooperating to yieldingly hold said flange against the sides of said drawer, said flange having rearwardly disposed terminals overhanging said sides and free of the rear corners of said drawer to facilitate removal of the latter from said receptacle.

7. In a box, the combination of, a casing, a receptacle mounted on a portion of said casing and comprising a relatively elongated flange secured to a wall of said receptacle and overhanging an inner face of a wall of said receptacle, a drawer slidably guided by said wall, and article-holding means disposed within said receptacle and above said drawer and having a portion thereof seated on said flange for yieldingly holding the latter against said drawer.

8. In a box, the combination of, a casing, a receptacle secured to a part of said casing and comprising a front wall including a portion bounded by kerfs and scored fulcrum means, the portion bounded by said kerfs and scored means constituting a member swung on said fulcrum means and out of said wall to define an opening therein and constitute a flange above said opening, a drawer slidably guided in said opening, and article-holding means mounted within said receptacle and having a portion seated on said flange to hold the latter against the sides of said drawer.

9. In a box, the combination of, a casing, a receptacle secured to a part of said casing and comprising a vertically disposed wall having a substantially centrally arranged portion movably secured to said wall, said portion being initially in and subsequently swung out of the plane of said wall and rearwardly of the latter to constitute an opening therein and define a flange substantially coextensive with the length of said opening, a drawer slidably guided in said opening and adapted to urge said flange upwardly, and article-holding means within said receptacle and having a marginal portion seated on said flange to hold the latter against the sides of said drawer.

10. In a box, the combination of, a casing, a receptacle secured to said casing and having flange, said flange being substantially complementary to a portion of the front wall of said receptacle and swung rearwardly of said portion to constitute an opening therein, a drawer slidably guided in said opening, said flange being superimposed relative to said drawer and constituting a seat, article-holding means within said receptacle and including a part mounted on said seat, the latter constituting intervening means between said article-holding means and drawer and defining a closure between said wall and said article-holding means, said flange having means projecting beyond the sides of said drawer to prevent rearward portions of said drawer from interlocking with rearward portions of said flange.

NICHOLAS SCANDORE.